United States Patent
Dunn et al.

(10) Patent No.: US 6,529,209 B1
(45) Date of Patent: Mar. 4, 2003

(54) METHOD FOR PROVIDING PRIVATELY VIEWABLE DATA IN A PUBLICALLY VIEWABLE DISPLAY

(75) Inventors: James M. Dunn, Fresno, CA (US); Edith H. Stern, Boca Raton, FL (US); Barry E. Willner, Briar Cliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/481,897

(22) Filed: Jan. 12, 2000

(51) Int. Cl.⁷ .................................................. G09G 5/36
(52) U.S. Cl. ...................... 345/629; 380/204; 380/207
(58) Field of Search ................................. 345/109, 629; 348/56; 351/158, 163; 380/54, 56, 59, 200, 204, 205, 207, 210, 212, 214, 221, 224, 225, 261, 270

(56) References Cited

U.S. PATENT DOCUMENTS

| | | | | |
|---|---|---|---|---|
| 5,510,832 A | * | 4/1996 | Garcia | 348/56 |
| 5,629,984 A | * | 5/1997 | McManis | 380/54 |
| 5,963,371 A | * | 10/1999 | Needham et al. | 359/464 |

FOREIGN PATENT DOCUMENTS

| | | |
|---|---|---|
| EP | 0731405 A2 | 9/1996 |
| JP | 04241393 A | 8/1992 |
| JP | 06175631 A | 6/1994 |
| JP | 06186506 | 7/1994 |
| JP | 07219489 A | 8/1995 |
| JP | 08030245 A | 2/1996 |

\* cited by examiner

*Primary Examiner*—Matthew Luu
*Assistant Examiner*—G. F. Cunningham
(74) *Attorney, Agent, or Firm*—Akerman Senterfitt (57) ABSTRACT

A method for providing privately viewable data in a publically viewable display comprises the steps of: generating a sequencing pattern; generating a data signal having interspersed frames of private data among frames of masking data according to the sequencing pattern; providing the data signal to the publically viewable display; and, opening and closing shutters in a set of active glasses in accordance with the sequencing pattern. In one embodiment, the sequencing pattern can correspond to alternating displays of the private data and the masking data. In an alternative embodiment, the sequencing pattern can correspond to combined left eye/right eye images of the private data. In the preferred embodiment, the masking data can be a fill pattern, for example, random data or a screen saver image. However, in another embodiment, the masking data can be a derivation of the private data. The step of opening and closing the shutters can comprise the step of responsive to sync pulses in the sequencing pattern, opening and closing the shutters. In consequence of the inventive method, a user viewing the display with the active glasses can view the private data and unauthorized viewers without the active glasses can view only the private data obscured by the masking data.

14 Claims, 8 Drawing Sheets

INITIAL SYNCHRONIZATION PATTERN

FIG. 4A

DATA TRANSMISSION PATTERN

METHOD FOR PROVIDING PRIVATELY VIEWABLE DATA IN A PUBLICALLY VIEWABLE DISPLAY

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of computer imagery and more particularly to a system and method for providing privately viewable data in a publically viewable display.

2. Description of the Related Art

The laptop computer has become a ubiquitous part of current computer technology. Laptops by their nature are used on trains, in airplanes, and in most public places. Still, portable computing carries with it a substantial disadvantage. Specifically, in a crowded environment, what is visible on the display screen of a laptop remains visible to all within viewing distance of the display screen. Thus, from the perspective of the laptop user, a potential security concern exists which can undermine the usefulness of the laptop. Exemplary cases include the use of laptop computers on airplanes where the seating and tray table arrangements are so close that the adjacent passengers can easily view one another's laptop screens. A similar situation exists in airport lounges, waiting rooms, etc.

Similar non-laptop security and privacy issues can arise in other environments. For example, in a high security environment, desktop machines are typically housed in separate rooms or cubicles to prevent adjacent workers from viewing each others screens. Additionally, Automatic Teller Machines (ATMs) are readily available, but almost always ATMs are placed in conspicuous locations for ease of use. The conspicuous nature of the chosen public location can contribute to the ease of observation, which can permit an unauthorized viewer to obtain an ATM user's confidential information as the user inserts their ATM card into the ATM and subsequently keys in a Personal Identification Number (PIN). Hence, it would be advantageous if a user could be provided with a private view of a publically viewable display screen while unauthorized viewers are provided with a different, public view of the same display screen.

Presently, techniques exist for rendering different images on a single display screen. Three-dimensional (3D) imaging represents the most well known example. 3D imaging involves presenting different images to each eye, allowing the human vision system to integrate each into one composite image. 3D imaging techniques can be implemented using various technologies, such as color filters or shutters. The display screen can include different images presented in an alternating fashion. The viewers eyes, using the visual persistence of the retina and the visual cortex, can integrate the alternating images into a unified image.

SUMMARY OF THE INVENTION

With active glasses, multiple visuals can be perceived using alternating imagery. Active glasses can be combined with a display controller for controlling the rate of alternating each displayed image. Advantageously, the presentation through the active glasses of private imagery interspersed among masking imagery can be programmed to match a sequencing rate used to sequentially intersperse the private imagery among the masking imagery in the display screen. Using the sequencing rate, which can be provided to an authorized viewer, but not an unauthorized viewer, it is possible to prevent the unauthorized viewers from perceiving the private imagery being displayed because without active glasses programmed to the sequencing rate, the private imagery cannot be visually extracted from the interspersed masking imagery.

In addition to secure viewing, other commercial applications incorporating active glasses technology are possible. For instance, a movie theater could provide active glasses to each of movie patrons in one theater. Multiple movies could be projected on the same screen, and in consequence of the active glasses technology, each patron could view only that movie sequenced to the patron's respective active glasses.

In general, the invention described herein permits only those authorized users (viewers) of an image to decipher a private image on a display while unauthorized users can view merely random patterns, unreadable imagery or perhaps a screen saver image. In furtherance of this purpose, imaging techniques including data hiding and alternating patterns, are combined with a wearable device, for example active glasses, synchronized with a display incorporating images produced by the imaging techniques. Finally, the known capability of the human vision system to fuse dissimilar images into a single image completes the ability to provide privately viewable data in a publically viewable display.

A method for providing privately viewable data in a publically viewable display comprises the steps of: generating a sequencing pattern; generating a data signal in which private data frames are interspersed among masking data frames according to the sequencing pattern; providing the data signal to the publically viewable display; and, opening and closing shutters in a set of active glasses in accordance with the sequencing pattern. In consequence of the inventive method, a user viewing the display with the active glasses can view the private data and unauthorized viewers without the active glasses can view only the masking data. The public data is the visual perception of the interspersed private and masking data.

The step of generating a data signal can comprise the steps of: inserting masking data in the data signal; and, inserting the private data in the data signal when indicated by sync pulses in the sequencing pattern. Alternatively, the step of generating a data signal can comprise the steps of: inserting masking data in the data signal; and, for private data forming a complete character or image, repeatedly inserting portions of the complete character or image when indicated by sync pulses in the sequencing pattern until all portions of the complete character or image are inserted in the data signal. In accordance with the alternative generating step, the display of the data signal, as viewed by the active glasses synchronized with the display according to the sequencing pattern is a strobed display of the complete character or image.

The step of opening and closing the shutters can comprise the step of responsive to sync pulses in the sequencing pattern, opening and closing the shutters. However, in a preferred embodiment, the sequencing pattern is encoded. Hence, in the preferred embodiment, the step of opening and closing the shutters can comprise the steps of: decoding the encoded sequencing pattern; and, responsive to sync pulses in the sequencing pattern, opening and closing the shutters. In one embodiment, the sequencing pattern can correspond to alternating displays of the private data and the masking data. In an alternative embodiment, the sequencing pattern can correspond to combined left eye/right eye images of the private data.

In the preferred embodiment, the masking data can be a fill pattern. Specifically, the fill pattern can be random data. In an alternative embodiment, the fill pattern can be a screen saver image. Finally, in yet another embodiment, the masking data can be a modified derivation of the private data, for example data having a modified color or data whose contents, position or size is physically offset from the contents, position or size, respectively, of the private data.

A system for providing privately viewable data in a publically viewable display can comprise: a computer comprising a display, a display driver, and at least one applications program; a pair of active glasses having shuttered lenses; a data communications link communicatively linking the computer with the active glasses; and, an encoder algorithm disposed in the computer for generating a sequencing pattern. The inventive system can further include an encoder application containing the encoding algorithm.

In the inventive system, the computer can intersperse frames of private data generated by the application among frames of masking data in a data signal according to the sequencing pattern. The computer can insert masking data in the data signal and can insert the private data in the data signal when indicated by sync pulses in the sequencing pattern. Alternatively, the computer can insert masking data in the data signal; however, for private data forming a complete character or image, the encoding algorithm can repeatedly insert portions of the complete character or image according to sync pulses in the sequencing pattern until all portions of the complete character or image are inserted in the data signal. As a result, the display of the data signal, as viewed by the active glasses synchronized with the display according to the sequencing pattern is a strobed display of the complete character or image.

Subsequently, the display driver can provide the data signal to the publically viewable display. Concurrently, the active glasses can be provided the sequencing pattern across the data communications link. Advantageously, the data communications link can be a wireless data communications link, for example an RF or infrared link. In response to receiving and decoding the sequencing pattern, the active glasses can open and close the shuttered display in accordance with the sequencing pattern. As a result, a user viewing the display with the active glasses can view the private data generated by the application, and unauthorized viewers without the active glasses can view only the public data. In the preferred embodiment, the masking data can be a fill pattern. Specifically, the fill pattern can be random data. Alternatively, the fill pattern can be a screen saver image. Finally, the masking data can be a modified derivation of the private data.

In the preferred embodiment, the active glasses can include a decoder for decoding the sequencing pattern. The decoder decodes the sequencing pattern; and, responsive to sync pulses in the sequencing pattern, opens and closes the shuttered lenses. Advantageously, the sequencing pattern can correspond to alternating displays of the private data and the masking data. Alternatively, the sequencing pattern can correspond to combined left eye/right eye images of the private data.

In an alternative embodiment, the system can include at least one additional pair of active glasses having shuttered lenses. In the alternative embodiment, the sequencing pattern can have sync pulses corresponding to each additional pair of active glasses by which the shuttered lenses of each additional pair of active glasses can open and close responsive to the corresponding sync pulses. Hence, in the alternative embodiment, each user viewing the display with a pair of active glasses can view private data corresponding to the pair of active glasses and unauthorized viewers without active glasses can view only the public data. A method in accordance with the alternative embodiment, for providing a series of privately viewable data corresponding to a plurality of authorized viewers in a publically viewable display can include the steps of providing a set of active glasses to each authorized viewer; generating a sequencing pattern; generating a data signal which includes a series of private data frames and masking data frames interspersed according to the sequencing pattern, each series of private data frames corresponding to an authorized viewer; providing the data signal to the publically viewable display; and, opening and closing shutters in each set of active glasses in accordance with the appropriate sequencing pattern. In consequence of the inventive method, each authorized viewer viewing the display with corresponding active glasses can view the corresponding series of private data and unauthorized viewers without active glasses can view only the masking data.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

Figure 1:
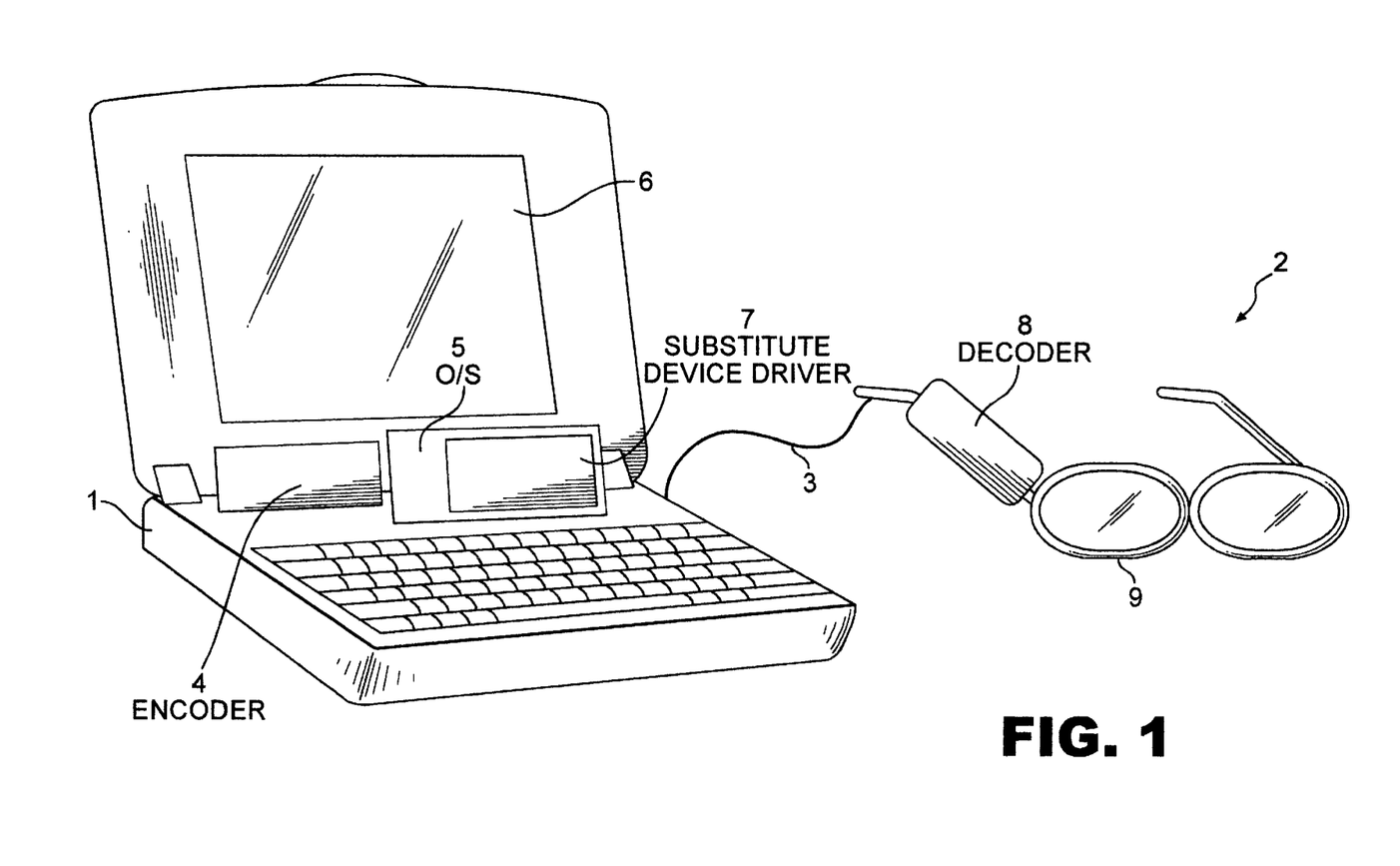
FIG. 1 is a diagramatic illustration of a laptop computer and a pair of active glasses, configured for use with the present invention.

The present invention, described herein, includes a system, method, and apparatus that taken together, provide a personal, private view of publically viewable data using visual data hiding. A basic system, in accordance with the inventive arrangements, can include a set of active glasses, a computer, a data communications link from the active glasses to a computer, encoding software contained within the computer, and a substitute display driver in the computer used by the encoding software in lieu of a standard display driver. FIG. 1 is a high level diagram of a laptop computer in accordance with the inventive arrangements. The system can include a laptop computer 1 having a display 6, a set of active glasses 2 having therein a shuttered display 9, and a communications link 3 connecting the computer 1 to the active glasses 2. Although the figure indicates a wire-based communications link, the invention is not limited in this regard. Rather, communications link 3 can include wireless solutions as well, for example an RF or infrared link.

The computer 1 can further include therein stored in a computer readable memory, an operating system 5, a substitute display device driver 7 and an encoder application 4. The substitute display device driver 7 can replace the standard original equipment manufacturer (OEM) device driver, typically used to communicate with video circuitry (not shown) in order to display video output in the display 6. More particularly, the substitute display device driver 7 can provide the video output to the display 6 and the active glasses 2 in a manner consistent with the inventive arrangements. Finally, the encoder 4 can execute as a stand-alone application program on the computer 1. The encoder 4 can encode video output from other executing applications and, if requested by a user of the computer 1, can transmit the encoded video output to the display 6 and a corresponding sync signal to the active glasses 2 in accordance with the inventive arrangements. Correspondingly, a decoder 8, included with the active glasses 2 can decode the sync signal received from the computer 1 in order to display privately the private information in the public video output through the shuttered lenses 9 of the active glasses 2.

Figure 2:
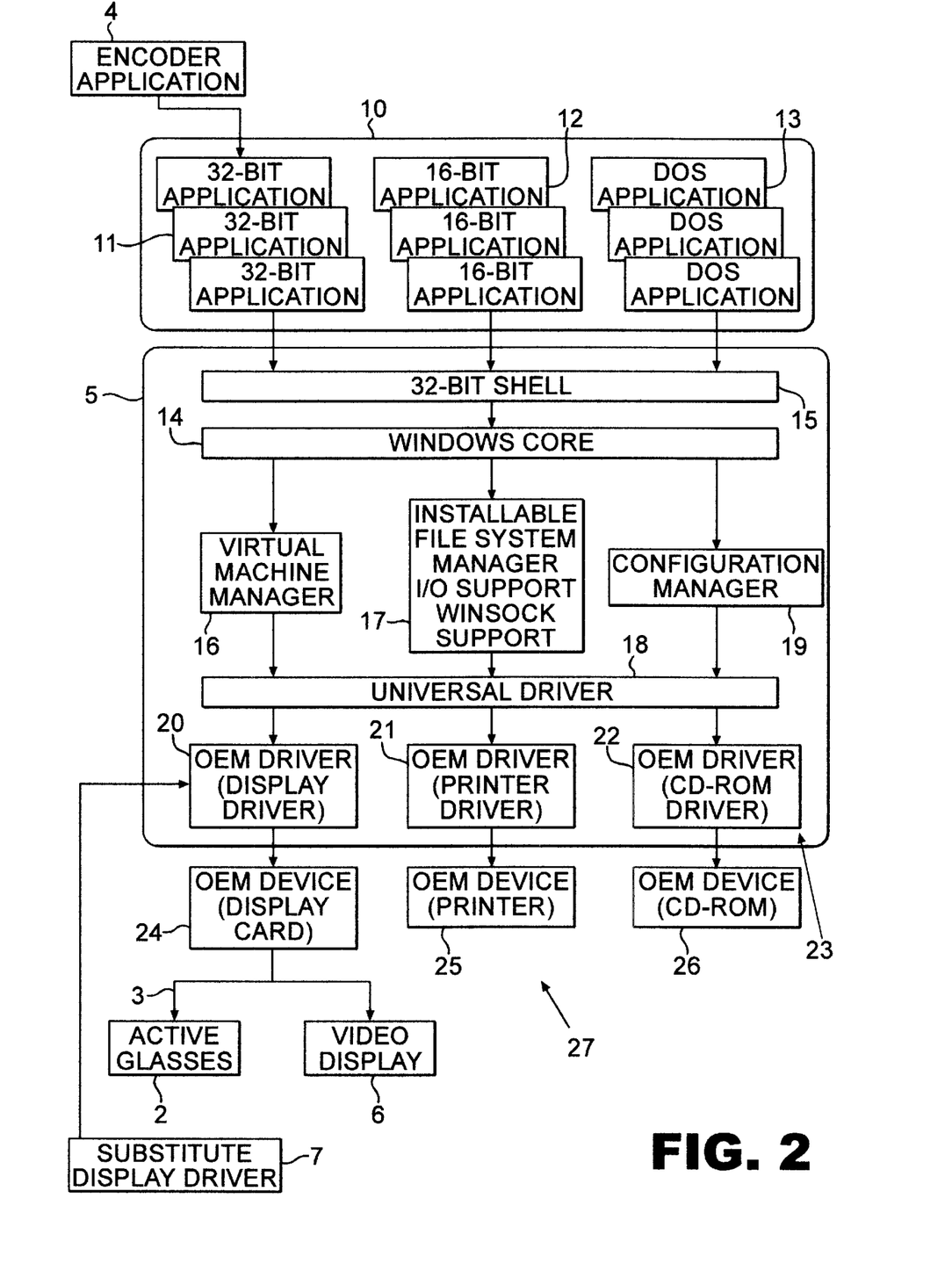
FIG. 2 is a schematic diagram of a computer software architecture modified for use with the present invention.

FIG. 2 is a schematic diagram of a typical windowing computer architecture and its internal operating system components, in accordance with the inventive arrangements. Notably, the figure indicates the architecture both prior and subsequent to modification by the inventive system. In FIG. 2, a typical computer architecture using the Microsoft Windows95® system (manufactured by Microsoft Corporation of Redmond, Washington) is shown as an example. One skilled in the art will recognize, however, that the invention is not limited in this regard. Rather, the present invention can be implemented in a similar manner using any operating system architecture having operative means for communication between the encoding software 4, the display 6 and active glasses 2. In a typical windowing architecture, however, the display 6 and active glasses 2 are separated from the encoding software 4 residing in an applications program layer 10 by several device driver layers including a universal driver layer 18 and a specific device driver layer 23.

Generally, in the preferred architechure, applications programs 10, including 32-bit applications 11, 16-bit applications 12 and DOS applications 13, communicate with one another through an operating system shell layer 15 included as part of the operating system 5. Through the operating system shell layer 15, applications programs 10 can communicate with appropriate device drivers 23 through an additional universal driver layer 18 which can invoke a device specific device driver, for example a display driver 20, printer driver 21 or CD-ROM driver 22, to communicate with a specific attached device 27, for example display card 24, printer 25 or CD-ROM 26. Additionally, in the Windows95 operating system, windows core 14, virtual machine manager 16, installable file system manager and winsock support module 17 and configuration manager 19 can exist in between the 32-bit shell 15 and the universal driver 18. Notwithstanding, the details of the internal Windows95 architecture are not pertinent to the present invention, except for the role of the operating system 5 as an intermediary between the application programs 10 and the device drivers 23. Specifically, using the Windows95 operating system, to pass a command to or receive data from a physical device 27, an applications program 10 preferably communicates with the physical device 27 through the operating system layer 5 and the specific device driver 23.

In FIG. 2, modifications and additions in accordance with the inventive arrangements are shown by the dashed-border boxes 2, 4 and 7. Specifically, FIG. 2 depicts a modified computer architecture incorporating an encoder applications program 4 and a substitute display driver 7. The substitute display driver 7 can replace the OEM display driver 20 in order to synchronously drive both the video display 6 and newly added active glasses 2. The encoder application, communicating with both the display 6 and active glasses 2 through the operating system 5 and substitute device driver 7, can synchronize the action of the shuttered lenses 9 (shown in FIG. 1) in the active glasses 2 with the presentation of images on the display 6 in order to provide the user with a private view of the video ouput shown in the display 6 while unauthorized users without the benefit of the synchronized active glasses 2 can view only random data.

Figure 3:
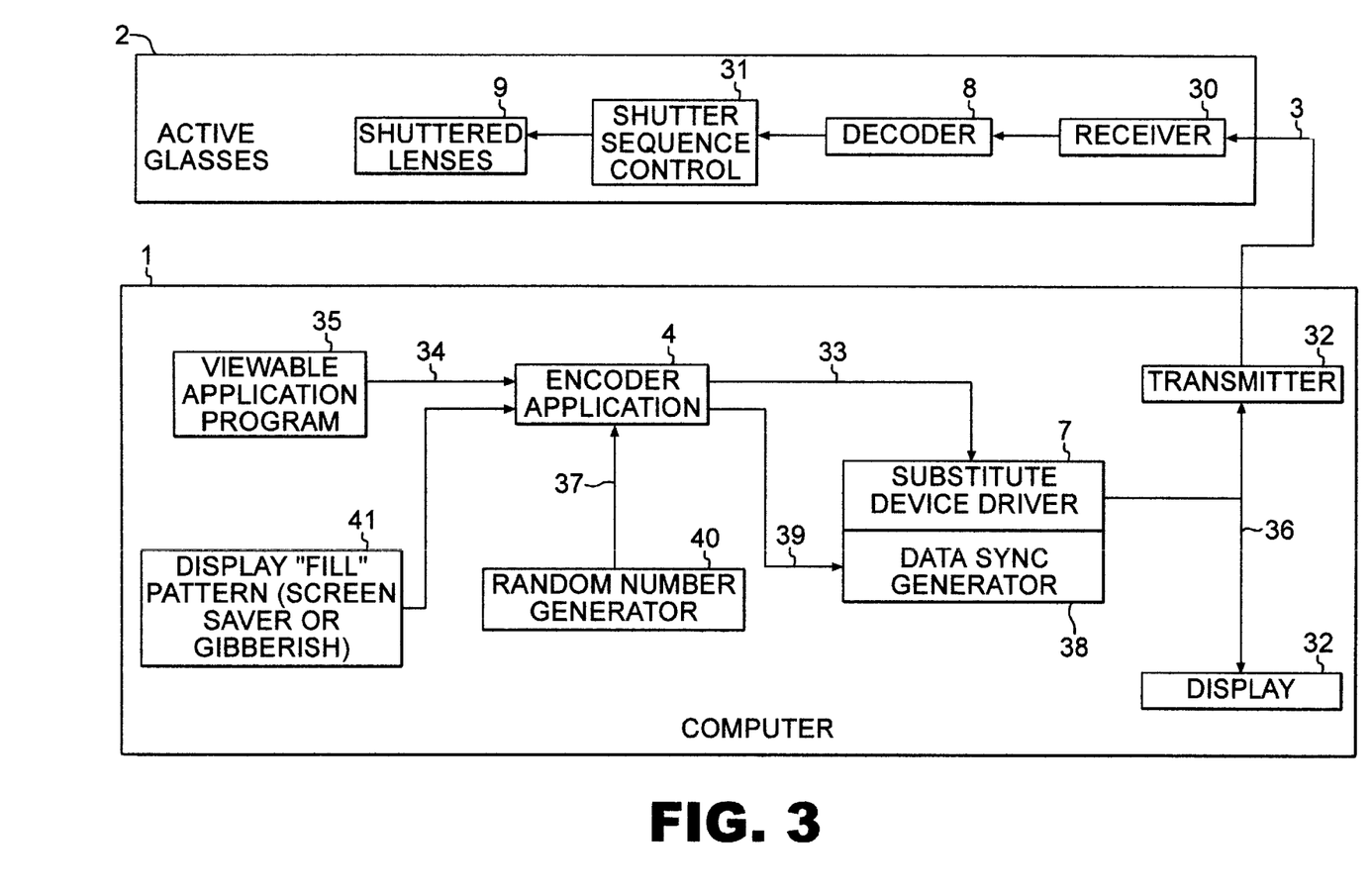
FIG. 3 is a schematic diagram illustrating the relationship between a computer and a pair of active glasses, both configured in accordance with the inventive arrangements.

The operation of the active glasses 2 in accordance with the inventive arrangements is shown diagramatically in FIG. 3. In the present invention, the active glasses 2 contain electro-optical elements typically found in active glasses, for example shutters in display 9. Specifically, a shutter sequence control 31 can control the sequencing of the shutters of display 9. In addition, as discussed above, the active glasses 2 can include a decoder 8 for decoding encoded sequencing data transmitted by the computer 1 and received by the active glasses in receiver 30 across data communications link 3.

In traditional 3D applications, each individual shutter can be opened and closed in an alternating manner. The only variable, if any, associated with the opening and closing of the shutters is the sequencing rate. In a preferred embodiment of the present invention, in addition to sequencing rate considerations, the decoder 8 can be used to synchronize the shutters of the active glasses 2 to a specific sequence pattern. Subsequently, the shuttered display 9 can be driven in a pattern that matches the pattern used to change the images in the display 6 attached to the computer 1.

In operation, the display 6 and the active glasses 2 are driven in synchronous operation by a specific pattern, creating in effect, a "strobe window" where only a portion of each character or graphic in the display 6 are displayed for one or the other of the user's eyes. At the next strobe, one or the other eye is presented with another portion of the character or graphic. After several strobes, a entire character or graphic in the display will have been reproduced. The number of strobes required can be dependent on the number of portions, or quadrants, per character used to develop an entire character on the display.

Figure 6A:
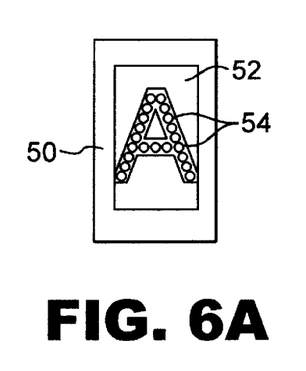
FIGS. 6A–6B, taken together, are illustrations of the formation and display of a character using strobing techniques.
Figure 6B:
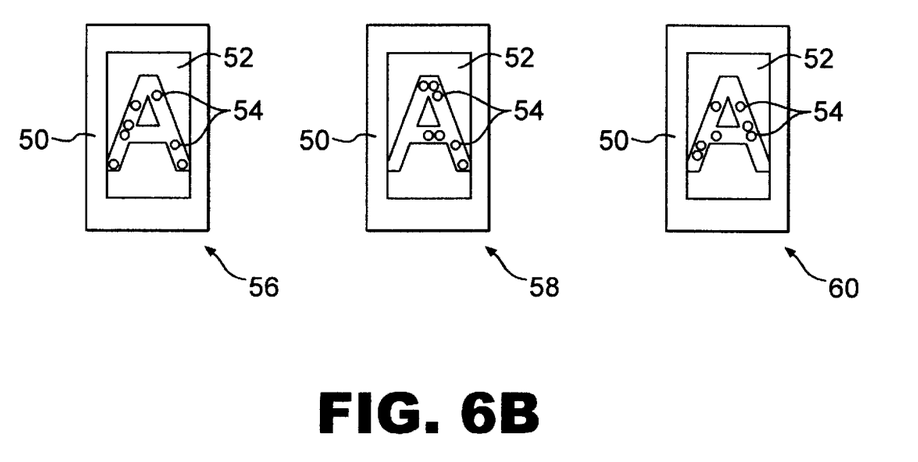

FIGS. 6A and 6B, taken together, illustrate an exemplary character formed using the above-described strobing technique. FIG. 6A illustrates a typical character display mechanism used in commercially available displays, well-known in the art. Each character in the display can be defined by a plurality of pixels 54 illuminated in a display. The pixels 54 are logically grouped into a character cell 50, and within that cell, a smaller character box 52. The intersections of the pixels 54 on an x-y axis of the character box 52 represent the possible locations of pixels 54 to illuminate for this character. Graphics can be described in the same manner, except the "boxes" are larger. In FIG. 6A, the character "A" is shown as it is "constructed" over the course of three "strobes" shown in FIG. 6B as described above. Notwithstanding, the pattern, as shown in FIG. 6B is merely an exemplary pattern. In fact, other combinations of pixels 54 could be chosen so long as a complete character can be formed subsequent to the completion of the sequencing pattern.

Advantageously, during each strobe, data unrelated to the private data can be displayed in the display screen 6 so that non-authorized users can observe only public data. For example, a screen-saver pattern can be employed as the unrelated public data. In particular, referring now to FIG. 3, the viewable application program 35 can provide standard video output 34 to the operating system 5 as it normally would in a computer 1, unmodified for the present invention. If enabled, the present invention can also generate a fill pattern 41 to create a public view for viewing by unauthorized viewers lacking the synchronized active glasses 2. Each of the standard video output 34 and the fill pattern 41 can be provided to the encoder application 4.

In order to synchronize the display 6 with the active glasses 2, the preferred embodiment can incorporate at least two sequencing patterns. One sequencing pattern simply opens or closes the shuttered lenses of the glasses 2 concurrently, and synchronously alternates the display between two different states. The first state can include the private data that the user wishes to view. The second image can include masking data, for example, a different screen, a screen saver, or the original image offset by some physical distance. For example, the image can be shifted one or more characters left or right, or shifted one or more lines up or down. If the screen is refreshed every 10 ms, the time between refresh points remains available for other sequences to be initiated so that other users on other machines in the same proximity can have their own private data views enabled. The latter method can prove useful for moderate levels of privacy and security.

A second sequencing pattern can include a specific combination of left eye/right eye images that can permit only the user to see each character on the screen. This second sequencing pattern can be more complex than the first sequencing pattern since the timing of the sequencing pattern and the sequencing of each left eye/right eye image can be variable. Nevertheless, in either case, without the specific sequencing information, the projected images will be unreadable to unauthorized users. Significantly, the projected images can be unreadable to unauthorized user having active glasses but lacking knowledge of the specific sequencing information.

In order to coordinate the specific sequencing of the display with the alternating action of the active glasses 2, the encoding application 4 can be employed. The encoding application 4, which implements a sequencing pattern encoding algorithm, preferably incorporates a random number as a seed for the encoding algorithm. The encoding algorithm can set the display device driver 7 and active glasses shutter sequence control 31 to a corresponding sequencing pattern. Advantageously, any popular encoding algorithm can be used in the sequencing pattern, so long as the algorithm can produce flicker-free operation.

Specifically, a set of guidelines exists for presenting different images in each eye while minimizing perceived flicker and eyestrain. Typical implementations employ a 120 Hz refresh rate, or as close to 120 Hz as possible according to the associated display's capability. However, because there are a number of monitors incapable of accommodating a 120 Hz refresh rate, a refresh rate adjustment utility can be provided to adjust and test the refresh rate setting whenever either a user selects a new resolution or connects a different display to the computer.

For example, at higher resolutions—i.e. 1024×768 and greater×a 100 Hz or 105 Hz refresh rate can accommodate a wide variety of displays that may not have a video bandwidth capable of coping with a 120 Hz refresh rate. Still, when the refresh rate falls below 120 Hz, the alternating pattern can become increasingly more noticeable. In particular, as the refresh rate falls below 90 Hz, flicker can become more apparent and may be problematic for some users. In contrast, for refresh rates above 90 Hz, flicker can be noticeable but not objectionable. Hence, refresh rates falling below 90 Hz preferably are avoided.

In order to properly synchronize the display 6 and the active glasses 2 in a secure manner, a random cycle time between strobe cycles can be chosen and inserted into the synchronization signal. In order to encode a synchronization signal with a random cycle time, the encoder application 4 can obtain a seed from random number generator 40 in order to create a random cycle time for use in synchronizing the display 6 and the active glasses 2. Specifically, as discussed in further detail herein, the seed can provide a foundation for delaying the display of privately viewable data in a subsequent strobe cycle, in between which the fill pattern will be inserted, and a public view therefore displayed.

The encoder 4 can generate a display signal 33 having the fill pattern 41 and interspersed therein according to the sequencing pattern of the synchronization signal, private data included in the standard video output 34. Concurrently, the encoder 4 can generate a data sync signal 39 for synchronizing the active glasses 2 with the display 6. The substitute device driver 7 can receive the display signal 33 while a data sync generator 38 can receive the data sync signal 39.

Initially, the substitute device driver 7, using the data sync generator 38, can initialize the active glasses 2 by transmitting through transmitter 32, an initialization sync signal (not shown) to the active glasses 2. Subsequently, the substitute device driver 7 can pass the data sync signal 39 to the active glasses 2 and the combined signal 33 to the display 6. By synchronizing the action of the shuttered display 9 using the data sync signal 39, the user can view only the portions of private data shown during the strobe (e.g. unmasked) cycles. The visual persistence of the user's eyes can integrate the strobed portions of private data into a unified, privately viewed image, secure from viewing by unauthorized users. Hence, the active glasses 2 can provide the user a private view of the data simultaneous to which an unauthorized viewer can see only the public pattern composed of the fill pattern 41 combined with the private view on the display 6.

Figure 4A:
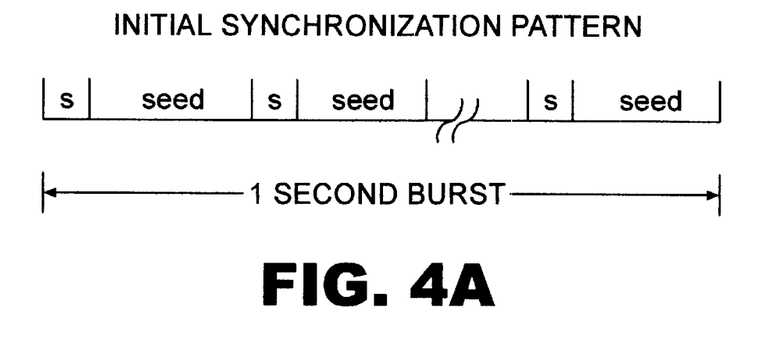
FIGS. 4A and 4B illustrate initialization synchronization and data transmission patterns used to synchronize the active glasses with a display of the computer.
Figure 4B:
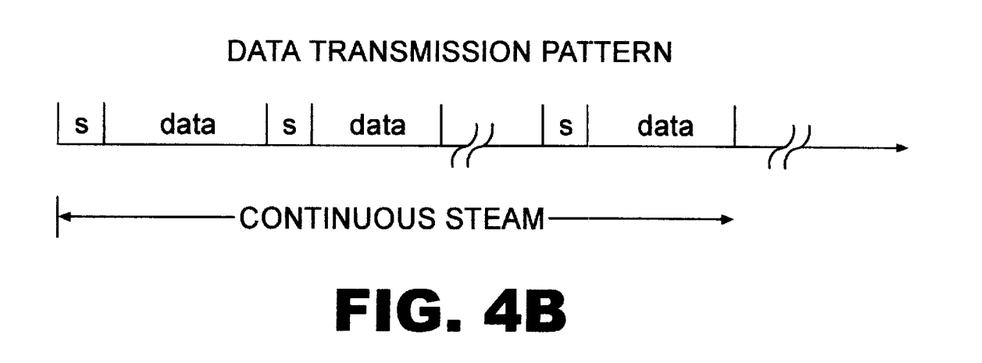

FIGS. 4A and 4B illustrate communications protocols which can be used for communications between the computer 1 and the active glasses 2. One skilled in the art will recognize however, that the protocols described herein are only exemplary of many protocols that could be equally and operatively employed. The important aspects of any protocol include the support for the initial synchronization of the computer 1 and active glasses 2 with the random seed, and the support for the transmission of the continuing synchronization between the computer 1 and the active glasses 2. Specifically, in the preferred embodiment, a user having a data communications link 3, preferably wireless, between the computer 1 and the active glasses 2 can turn away from the display 6, loose a communications connection across the data communications link 3, turn back to the display 6 and regain the communications connection. In addition, the continuing synchronization can eliminate the need for the active glasses 2 to maintain an accurate timer during the sequencing operation.

As shown in FIGS. 4A and 4B, the preferred embodiment can include two protocols, an initialization protocol and a data transmission protocol. As shown in FIG. 4A, the initialization protocol can initialize the active glasses 2 using the same seed used by the computer 1 to encode the shutter sequence in a data sync signal 39. Notably, as discussed above, the data sync signal 39 is merely an encoded shutter sequence and not the standard video output 34 which is combined with the fill pattern 41 and hidden on the display 6. The active glasses 2 can be initialized by a short burst, preferably one second or less, that transmits a data sync pattern for establishing communications between the computer 1 and the active glasses 2, and the seed pattern itself. Notably, as is well known in the art of data communications, the data sync pattern can be any pattern based on the error characteristics of the data communications link.

As shown in FIG. 4A, the initialization protocol preferably can be broadcast as a burst in order to prevent other proximate receivers from receiving and decoding the seed pattern. Still, the user preferably can add additional security by ensuring that no other active glasses in the area are being initialized at the same time. In the case of an infrared data communications link, the user can simply shield the transmitter and receiver path with the user's hand for the duration of the burst. Alternatively, in the case of an RF link, a serial number can be stored in a fixed memory in the active glasses 2. In consequence, the encoding application can use the serial number as part of the seed pattern so that only corresponding active glasses can decode the seed pattern.

FIG. 4B also illustrates a data transmission protocol. The data transmission protocol, like the initialization protocol, can include a broadcast of a data sync pattern and a data pattern. The data sync pattern may be the same or different than the initialization sync pattern. In fact, the data sync pattern can be eliminated if an encoding pattern, for example NRZ or NRZI, is used in the data communications link to denote timing data to be extracted by the active glasses. Still, since the data pattern is an encoded shutter synchronization pattern for the active glasses 2 to decode and apply, in incorporating a data sync pattern it is possible to further enhance security.

For example, notably each data pattern can differ so the shutter sequence can be continuously varied. The decoder 8 residing on the active glasses 2 simply can apply the new synchronization pattern, decoded in each data sync frame. Further security can be incorporated by varying the durations of each data sync frame. As a result, in broadcasting several synchronization patterns of differing length between each data sync, the active glasses decoder 8 can still extract the synchronization pattern as a continuous stream of left eye/right eye shutter actions.

Figure 5A:
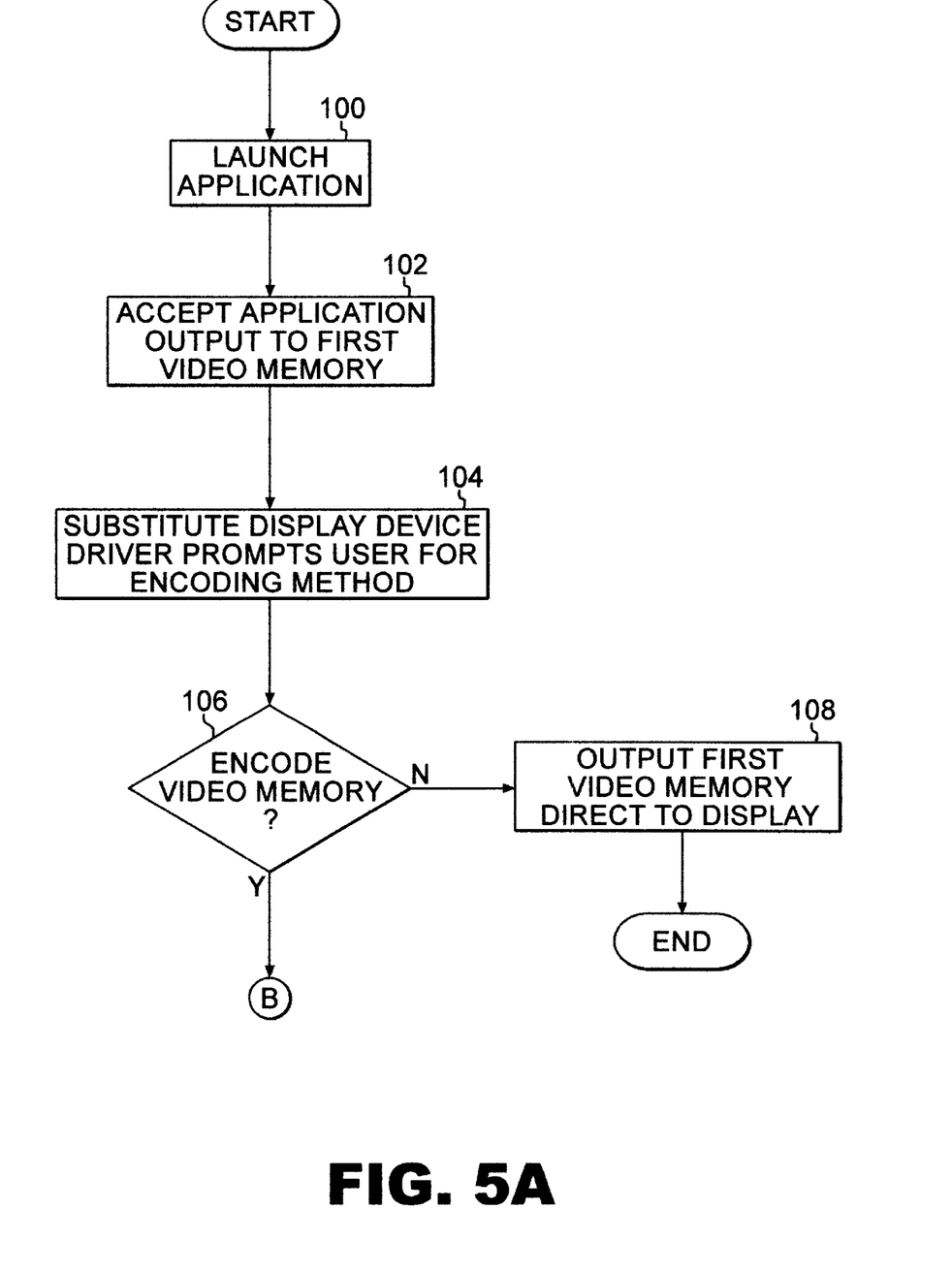
FIGS. 5A–5C, taken together, are flowcharts illustrating an inventive method for providing privately viewable data in a publically viewable display.
Figure 5B:
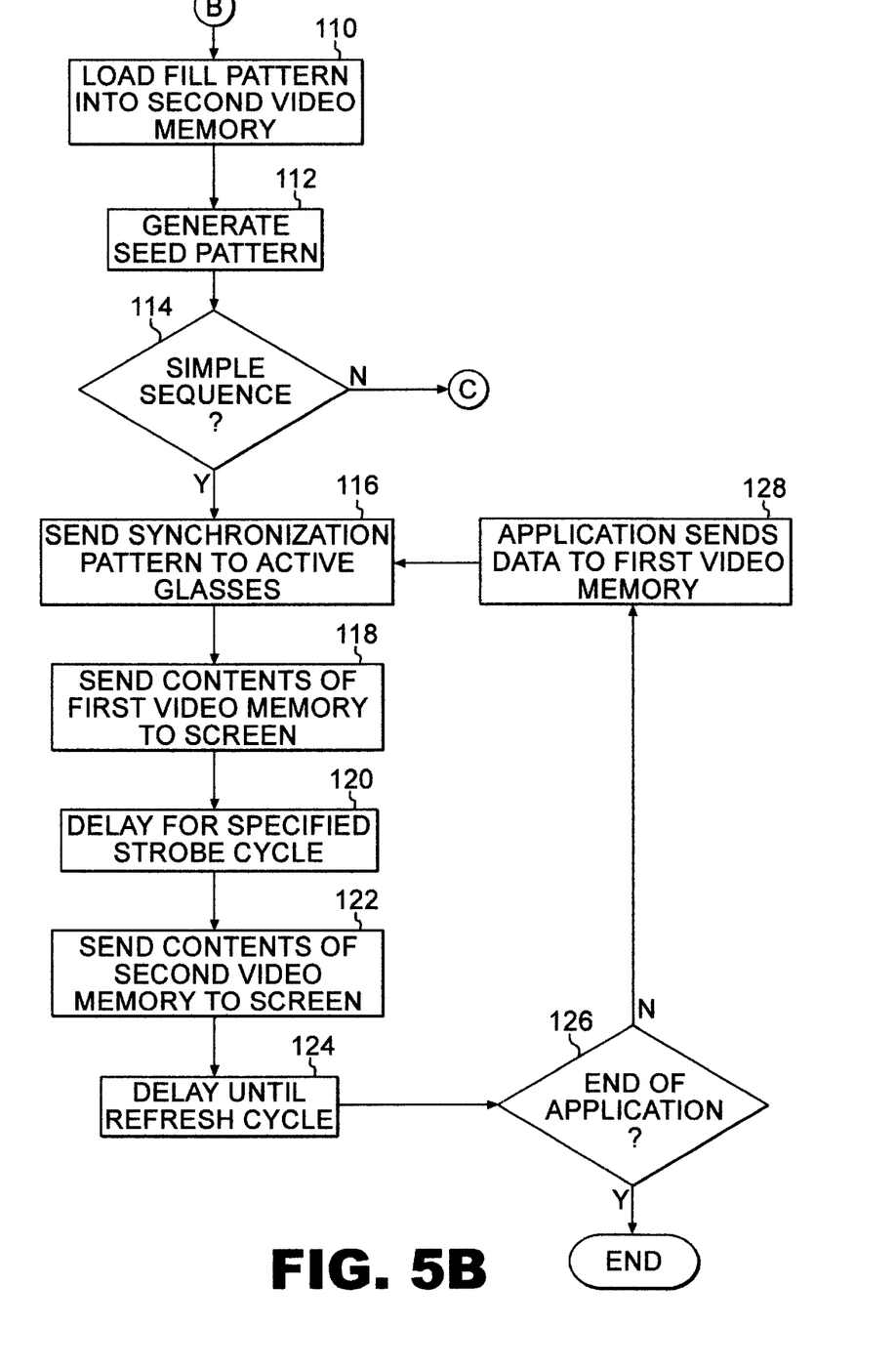
Figure 5C:
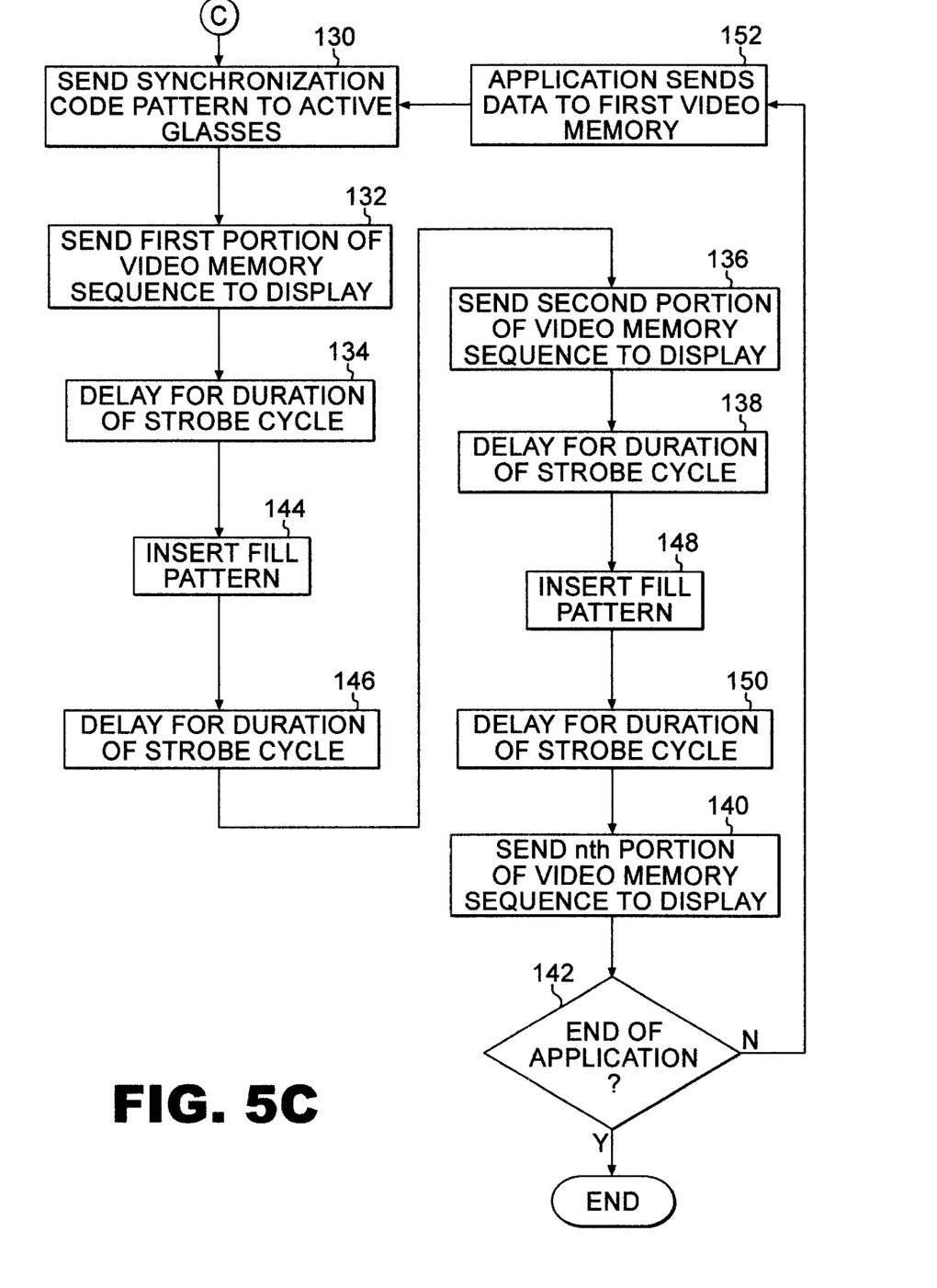

FIGS. 5A–5C, taken togther, are flow charts illustrating a method for providing privately viewable data in a publically viewable display. The method begins in step 100 during which an applications program residing in an applications layer of an operating system can be launched either automatically or manually by a user. In step 102, standard video output can be generated by the application and provided to the operating system for viewing on the display. Ultimately, the standard video output can be stored in a first video memory.

In step 104, the encoding application, or optionally, the substitute display driver—a replacement for a standard OEM display driver—receives notification of an attempt to provide video output to the display. In response, either the encoding application or, optionally the substitute display driver, prompts the user for an encoding method which can include simple sequencing, complex sequencing, or no sequencing at all. If the user chooses not to encode the video output, for instance where security is not of any particular concern, in step 108, the contents of the first video memory are output directly to the display as would normally occur in a computer system unmodified by the present inventive arrangements.

As shown in FIG. 5B, if the user chooses to encode the video output, for instance where security is of a particular concern, in step 110, a fill pattern can be loaded in a second video memory. Significantly, the fill pattern can include random data, or perhaps a screen saver image. Regardless, unauthorized viewers without active glasses synchronized in accordance with the inventive arrangements, in lieu of viewing private data, will view only the public pattern on the user's screen. Subsequently, in step 112, a seed pattern can be generated in order to determine a random cycle time for a data sync pattern.

In decision step 114, if the user has chosen a simple sequence pattern, in step 116, the synchronization pattern, generated using the random seed, can be transmitted to the active glasses so as to synchronize the action of the shuttered lenses with the strobing of the private data output to the display. Subsequently, in step 118, the contents of the first video memory can be output to the display. Following the output of the first video memory, a delay corresponding to the seed can be incurred in step 120. In step 122, in between the display of the private data, the contents of the second video memory—the fill pattern—can be transmitted to the display. Finally, in step 124, an additional delay can be incurred until the next refresh cycle of the display. The process can repeat with additional video output being provided by the application in step 128 until, in decision step 126, it is determined that the application has ended and, thus, has no further video output to be provided to the display. In this way, the user having the synchronized active glasses will view only the private data in the first video memory in accordance with the alternating action of the shuttered LCD projection display. Correspondingly, unauthorized viewers not having the synchronized active glasses will view only the public pattern composed of the fill pattern combined with the private view on the display. Notably, the private data is obscured by the fill pattern.

If in decision step 114, the user chooses to encode the video output using a complex sequence, as shown in FIG. 5C, in step 130, the synchronization pattern, generated using the random seed, can be transmitted to the active glasses so as to synchronize the action of the shuttered lenses with the strobing of the private data output to the display. Subsequently, in step 132, a first portion of the contents of the first video memory can be output to the display. Following the output of the first portion of the contents of the first video memory, a delay corresponding to the seed can be incurred in step 134. In step 144 a fill pattern can be output to the display. Subsequently, in step 146, a delay corresponding to the seed can be incurred.

In step 136, a second portion of the contents of the first video memory can be output to the display. Following the output of the second portion of the contents of the first video memory, an additional delay corresponding to the seed can be incurred in step 138. As in step 144, in step 148 a fill pattern can be output to the display. Subsequently, in step 150, a delay corresponding to the seed can be incurred.

Additional portions of the contents of the first video memory can continue to be output to the display followed by corresponding delays and fill patterns. Finally, in step 140, the last portion of the contents of the first video memory can be displayed. The process can repeat with additional video output being provided by the application in step 152 until, in decision step 142, it is determined that the application has ended and, thus, has no further video output to be provided to the display. In this way, the user having the synchronized active glasses will view and integrate only the portions of private data in the first video memory in accordance with the alternating action of the shuttered lenses. Correspondingly, unauthorized viewers not having the synchronized active glasses will view only the public pattern while the private data is obscured by the fill pattern.

What is claimed is:

1. A method for providing privately viewable data in a publically viewable display comprising the steps of:
   generating a sequencing pattern;
   generating a data signal, said data signal comprising private data frames and masking data frames interspersed according to said sequencing pattern, said step of generating a data signal comprising the steps of inserting masking data in said data signal, and, for private data forming a complete character or image, repeatedly inserting portions of said complete character or image when indicated by sync pulses in said sequencing pattern until all portions of said complete character or image are inserted in said data signal;
   providing said data signal to said publically viewable display; and,
   opening and closing shutters in a set of active glasses in accordance with said sequencing pattern,
   whereby a user viewing said display with said active glasses can view said private data and unauthorized viewers without said active glasses can view only said private data obscured by said masking data.

2. A method for providing privately viewable data in a publically viewable display comprising the steps of:
   generating a sequencing pattern;
   generating a data signal, said data signal comprising private data frames and masking data frames interspersed according to said sequencing pattern, wherein said masking data is a screen saver image;
   providing said data signal to said publically viewable display; and,
   opening and closing shutters in a set of active glasses in accordance with said sequencing pattern,
   whereby a user viewing said display with said active glasses can view said private data and unauthorized viewers without said active glasses can view only said private data obscured by said masking data.

3. A method for providing privately viewable data in a publically viewable display comprising the steps of:
   generating a sequencing pattern;
   generating a data signal, said data signal comprising private data frames and masking data frames interspersed according to said sequencing pattern, wherein said masking data is a derivation of said private data;
   providing said data signal to said publically viewable display; and,
   opening and closing shutters in a set of active glasses in accordance with said sequencing pattern,
   whereby a user viewing said display with said active glasses can view said private data and unauthorized viewers without said active glasses can view only said private data obscured by said masking data.

4. A system for providing privately viewable data in a publically viewable display comprising:
   a computer comprising a display, a display driver, and at least one applications program;
   a pair of active glasses having shuttered lenses;
   a data communications link communicatively linking said computer with said active glasses;
   an encoder algorithm disposed in said computer for generating a sequencing pattern;
   said computer interspersing frames of private data generated by said application among frames of masking data in a data signal according to said sequencing pattern, wherein said computer inserts masking data in said data signal and, for private data forming a complete character or image, repeatedly inserts portions of said complete character or image when indicated by sync pulses in said sequencing pattern until all portions of said complete character or image are inserted in said data signal;
   said display driver providing said data signal to said publically viewable display;
   said active glasses being provided said sequencing pattern across said data communications link; and,
   said active glasses opening and closing said shuttered lenses in accordance with said sequencing pattern,
   whereby a user viewing said display with said active glasses can view said private data generated by said application, and unauthorized viewers without said active glasses can view only said private data obscured by said masking data.

5. A system for providing privately viewable data in a publically viewable display comprising:
   a computer comprising a display, a display driver, and at least one applications program;
   a pair of active glasses having shuttered lenses;
   a data communications link communicatively linking said computer with said active glasses;
   an encoder algorithm disposed in said computer for generating a sequencing pattern;
   said computer interspersing frames of private data generated by said application among frames of masking data in a data signal according to said sequencing pattern, wherein said masking data is a screen saver image;
   said display driver providing said data signal to said publically viewable display;
   said active glasses being provided said sequencing pattern across said data communications link; and,
   said active glasses opening and closing said shuttered lenses in accordance with said sequencing pattern,
   whereby a user viewing said display with said active glasses can view said private data generated by said application, and unauthorized viewers without said active glasses can view only said private data obscured by said masking data.

6. A system for providing privately viewable data in a publically viewable display comprising:
   a computer comprising a display, a display driver, and at least one applications program;
   a pair of active glasses having shuttered lenses;
   a data communications link communicatively linking said computer with said active glasses;

an encoder algorithm disposed in said computer for generating a sequencing pattern;

said computer interspersing frames of private data generated by said application among frames of masking data in a data signal according to said sequencing pattern, wherein said masking data is a derivation of said private data;

said display driver providing said data signal to said publically viewable display;

said active glasses being provided said sequencing pattern across said data communications link; and, said active glasses opening and closing said shuttered lenses in accordance with said sequencing patter, whereby a user viewing said display with said active glasses can view said private data generated by said application, and unauthorized viewers without said active glasses can view only said private data obscured by said masking data.

7. The system according to claim 4, further comprising:

at least one additional pair of active glasses having shuttered lenses;

said sequencing pattern comprising sync pulses corresponding to each additional pair of active glasses; and said shuttered lenses in each additional pair of active glasses opening and closing responsive to said corresponding sync pulses;

whereby each user viewing said display with a pair of active glasses can view private data corresponding to said pair of active glasses, and unauthorized viewers without active glasses can view only said private data obscured by said masking data.

8. A computer apparatus programmed with a set of instructions stored in a fixed medium, said programmed computer apparatus comprising:

means for generating a sequencing pattern;

means for generating a data signal, said data signal comprising private data frames and masking data frames interspersed according to said sequencing pattern, said means for generating a data signal comprises means for inserting masking data in said data signal, and, for private data forming a complete character or image, means for repeatedly inserting portions of said complete character or image when indicated by sync pulses in said sequencing pattern until all portions of said complete character or image are inserted in said data signal;

means for providing said data signal to a publically viewable display; and, means for opening and closing shutters in a set of active glasses in accordance with said sequencing pattern, whereby a user viewing said display with said active glasses can view said private data, and unauthorized viewers without said active glasses can view only said private data obscured by said masking data.

9. A computer apparatus programmed with a routine set of instructions stored in a fixed medium, said programmed computer apparatus comprising:

means for generating a sequencing pattern;

means for generating a data signal, said data signal comprising private data frames and masking data frames interspersed according to said sequencing pattern, wherein said masking data is a screen saver image;

means for providing said data signal to a publically viewable display; and, means for opening and closing shutters in a set of active glasses in accordance with said sequencing pattern, whereby a user viewing said display with said active glasses can view said private data, and unauthorized viewers without said active glasses can view only said private data obscured by said masking data.

10. A computer apparatus programmed with a routine set of instructions stored in a fixed medium, said programmed computer apparatus comprising:

means for generating a sequencing pattern;

means for generating a data signal, said data signal comprising private data frames and masking data frames interspersed according to said sequencing pattern, wherein said masking data is a derivation of said private data;

means for providing said data signal to a publically viewable display; and, means for opening and closing shutters in a set of active glasses in accordance with said sequencing pattern, whereby a user viewing said display with said active glasses can view said private data, and unauthorized viewers without said active glasses can view only said private data obscured by said masking data.

11. A machine readable storage, having stored thereon a computer program having a plurality of code sections executable by a machine for causing the machine to perform the steps of:

generating a sequencing pattern;

generating a data signal, said data signal comprising private data frames and masking data frames interspersed according to said sequencing pattern, said step of generating a data signal comprising the steps of inserting masking data in said data signal, and, for private data forming a complete character or image, repeatedly inserting portions of said complete character or image when indicated by sync pulses in said sequencing pattern until all portions of said complete character or image are inserted in said data signal;

providing said data signal to said publically viewable display; and, opening and closing shutters in a set of active glasses in accordance with said sequencing pattern, whereby a user viewing said display with said active glasses can view said private data and unauthorized viewers without said active glasses can view only said private data obscured by said masking data.

12. A machine readable storage, having stored thereon a computer program having a plurality of code sections executable by a machine for causing the machine to perform the steps of:

generating a sequencing pattern;

generating a data signal, said data signal comprising private data frames and masking data frames interspersed according to said sequencing pattern, wherein said masking data is a screen saver image;

providing said data signal to said publically viewable display; and, opening and closing shutters in a set of active glasses in accordance with said sequencing pattern, whereby a user viewing said display with said active glasses can view said private data and unauthorized viewers without said active glasses can view only said private data obscured by said masking data.

13. A machine readable storage, having stored thereon a computer program having a plurality of code sections executable by a machine for causing the machine to perform the steps of:

generating a sequencing pattern;

generating a data signal, said data signal comprising private data frames and masking data frames interspersed according to said sequencing pattern, wherein said masking data is a derivation of said private data;

providing said data signal to said publically viewable display; and, opening and closing shutters in a set of active glasses in accordance with said sequencing pattern, whereby a user viewing said display with said active glasses can view said private data and unauthorized viewers without said active glasses can view only said private data obscured by said masking data.

14. A method for providing a series of privately viewable data corresponding to a plurality of authorized viewers in a publically viewable display comprising the steps of:

providing a set of active glasses to each authorized viewer;

generating a sequencing pattern;

generating a data signal, said data signal comprising a series of private data frames and masking data frames interspersed according to said sequencing pattern, each series of private data frames corresponding to at least one authorized viewer, said step of generating a data signal comprising the steps of inserting masking data in said data signal, and, for private data forming a complete character or image, repeatedly inserting portions of said complete character or image when indicated by sync pulses in said sequencing pattern until all portions of said complete character or image are inserted in said data signal;

providing said data signal to said publically viewable display; and, opening and closing shutters in each set of active glasses in accordance with said sequencing pattern, whereby each authorized viewer viewing said display with corresponding active glasses can view said corresponding series of private data and unauthorized viewers without active glasses can view only said private data frames obscured by said masking data frames.

* * * * *